United States Patent [19]

Blattner

[11] Patent Number: 4,784,805
[45] Date of Patent: Nov. 15, 1988

[54] PROCESS FOR THE PREPARATION OF ANTHRAQUINOID INTERMEDIATES AND VAT DYES

[75] Inventor: Rudolf Blattner, Rheinfelden, Fed. Rep. of Germany

[73] Assignee: Ciba-Geiby Corporation, Ardsley, N.Y.

[21] Appl. No.: 46,500

[22] Filed: May 7, 1987

[30] Foreign Application Priority Data

May 15, 1986 [CH] Switzerland ......................... 1972/86

[51] Int. Cl.$^4$ ....................... C07C 50/22; C07C 50/18; C07C 103/75; C09B 3/22
[52] U.S. Cl. .................................... 260/352; 260/353; 260/358; 260/360; 260/369; 260/377
[58] Field of Search ............... 260/352, 353, 360, 369, 260/358, 377

[56] References Cited

U.S. PATENT DOCUMENTS 1,713,680  5/1929  Stein et al. ........................ 260/353
3,004,029 10/1961  Hardy et al. ...................... 260/352
3,418,321 12/1968  Gordon et al. .................... 260/358

FOREIGN PATENT DOCUMENTS 291131  5/1928  United Kingdom ............... 260/352
300331 11/1928  United Kingdom ............... 260/352

Primary Examiner—Richard L. Raymond
Assistant Examiner—Raymond Covington
Attorney, Agent, or Firm—Kevin T. Mansfield; Edward M. Roberts

[57] ABSTRACT

A novel process for the preparation of anthraquinoid intermediates and vat dyes by alkali fusion of suitable precursors in the presence of alcohol. The process comprises starting from benzanthrone, pyrazolanthrone or anthraquinone derivatives and carrying out the reaction in a machine with kneading action and in the presence of an alkali metal hydroxide and an aliphatic alcohol with a boiling point below 120° C., at elevated temperature, to effect dimerization or cyclization, the weight ratio of alkali metal hydroxide to benzanthrone, pyrazolanthrone or anthraquinone derivative being <1:1.

The process makes it possible to prepare in good quality anthraquinoid intermediate which can be further processed to dyes, as well as vat dyes which are suitable for dyeing or printing cellulosic material.

15 Claims, No Drawings

PROCESS FOR THE PREPARATION OF ANTHRAQUINOID INTERMEDIATES AND VAT DYES

The present invention relates to a process for the preparation of anthraquinoid intermediates and vat dyes by alkali fusion of suitable precursors in the presence of alcohol.

The preparation of anthraquinoid intermediates and vat dyes by alkali fusion in the presence of alcohol is known e.g. from Ullmanns Encyclopädie der Technischen Chemie, Vol. 3[1953], pp. 719-724. However, the processes described therein require substantial amounts of alkali and solvent. This constitutes a serious drawback from the economic and, especially, environmental point of view.

According to U.S. patent specification No. 3,418,321, less alkali is needed by carrying out corresponding reactions in the presence of a hydroxylated solvent with a boiling point above 125° C. in a ball mill in which the reaction mixture is constantly finely ground.

Surprisingly, it has now been found that particularly small amounts of alkali metal hydroxide suffice if appropriate reactions are carried out in the presence of an aliphatic alcohol in a machine with efficient kneading action but without grinding action.

Accordingly, the present invention relates to a process for the preparation of anthraquinoid intermediates and vat dyes obtained from unsubstituted or substituted benzanthrone, pyrazolanthrone or anthraquinone derivatives, in the presence of an alkali metal hydroxide and an aliphatic alcohol with a boiling point below 120° C., at elevated temperature, to effect dimerisation or cyclisation, which process comprises carrying out the reaction in a weight ratio of alkali metal hydroxide to benzanthrone, pyrazolanthrone or anthraquinone derivative less than 1:1 in a machine with kneading action.

The alkali metal hydroxide is e.g. potassium hydroxide, sodium hydroxide or, preferably, a mixture of potassium hydroxide and sodium hydroxide.

If a mixture of both hydroxides is used, then the weight ratio of potassium hydroxide to sodium hydroxide is 50:50 to 99:1, preferably from 60:40 to 90:10 and most preferably, from 70:30 to 80:20.

The weight ratio of alkali metal hydroxide to salt-free starting material, namely a benzanthrone, pyrazolanthrone or anthraquinone derivative is preferably from 0.5:1 to 0.95:1 and, most preferably, from 0.55:1 to 0.9:1.

The aliphatic alcohol employed in the process of the invention has a boiling point below 120° C. Particularly suitable aliphatic alcohol are $C_1$-$C_4$ alkanols, e.g. methanol, ethanol, n-propanol or isopropanol, or n-butanol, isobutanol or tert-butanol. It is particularly preferred to use ethanol, isopropanol or, most preferably, methanol. Mixtures of these alcohols are also suitable.

The process is carried out with e.g. the 1- to 4-fold, preferably 1.5- to 3-fold, amount by weight of alcohol, based on the alkali metal hydroxide. The bulk of the alcohol, i.e. 90% thereof, can be readily recovered during and after the reaction and is then available for further batches. The reaction is conveniently carried out in the temperature range from 120° to 200° C., preferably from 125° to 150° C.

Machines that operate with kneading action will be understood as meaning machines suitable for mixing, dispersing or homogenising and which are suitable for processing the liquid/solid components under strong dynamic force. Processing (kneading) is normally effected such that parts of the machine that run in the same or opposite direction and preferably at different speeds, e.g. rollers, discs, shafts, tightly intermeshing gear wheels and screws, mix the components with one another, with or without the application of shearing forces. Besides actual kneaders and extruders themselves, such machines with kneading action are e.g. dissolvers, dispersing machines and roll mills. These machines can operate discontinuously or continuously and are widely available in commercial form.

The following types of apparatus are suitable for the process of this invention: paddle driers with impact rods, high-speed paddle driers (with end-milling cutters or inserted dowelled disc mills), single or double screw extruders, all-phase drier reactors or trough kneaders with self-cleansing.

Particularly suitable for the process are mixers and kneaders of the "Drais T-Reactor", "Lödige Druvatherm", "List AP6 Batch","List Discotherm B", "Turbo-Sphere" or "Héliglobe" type.

Unsuitable for the process of this invention are pebble mills and similar machines with strong grinding action, as these machines are not able to disperse or homogenise sufficiently the liquid/solid reaction mixtures obtained by the process of the invention. Further, their use is limited to specific solvents which have e.g. a boiling point above 125° C.

Suitable starting materials for the process of this invention are preferably benzanthrone, pyrazolanthrone or anthraquinone derivatives, e.g. benzanthrone or pyrazolanthrone which is unsubstituted or substituted by one or more members selected from the group consisting of amino, benzamido, halogen or methoxy; and also di(benzanthron-3-yl)sulfide, 2-(benzanthron-3-yl)pyrazolanthrone, anthrimides which are derived from benzanthrone, 1- or 2-aminoanthraquinone or 2,2'-dimethyldianthraquinon-1,1'-d If the starting material is benzanthrone or pyrazolanthrone, it is preferably unsubstituted or substituted by one or two amino or methoxy groups or by one or two chlorine atoms. Amino substituents may be subsequently further reacted, e.g. benzoylated. Most preferably the benzanthrone or pyrazolanthrone is unsubstituted.

If the starting material is an anthrimide it is preferably obtained in a manner known per se from halogenated benzanthrone and 1-aminoanthraquinone which may or may not carry further substituents. The benzanthrone is in this case preferably substituted by one or two chlorine, or preferably bromine, atoms. Mixtures of mono- and dichlorinated or mono- or dibrominated benzanthrone are also suitable. The 1-aminoanthraquinone is unsubstituted or substituted e.g. by amino, benzamido, halogen or methoxy. Any amino groups present can be further reacted after the termination of alkali fusion, e.g. benzoylated.

Preferred anthrimides are those obtained from mono- or dibrominated benzanthrone and 1-aminoanthraquinone which is unsubstituted or further substituted by amino or benzamido.

Especially preferred are anthrimides which are obtained from 3-bromobenzanthrone and 1-aminoanthraquinone as well as from 3,9-dibromobenzanthrone and 1-aminoanthraquinone.

The reaction of the starting materials in the process of this invention takes place with e.g. dimerisation to form a new C—C bond, an example of which is the reaction of benzanthrone to 4,4'-dibenzanthrone, or with cyclisation to form one or two new C—C or C—N bonds. Examples of suitable cyclisation reactions are the reaction of benzanthrone to violanthrone or the alkali fusion of the anthrimide of 3-bromobenzanthrone and 1-aminoanthraquinone, in which a vat dye having acridine structure is obtained. The process is especially suitable for those reactions in the course of which one or two new C—C bonds are formed.

The anthraquinoid intermediates and vat dyes obtainable by the process of this invention are e.g. 4,4'-dibenzanthrone, 3,3'-dipyrazolanthrone, indanthrone, pyranthrone or benzanthrone dyes. The term "benzanthrone dyes" will be understood in this context as meaning (with reference to Ullmann's Encyclopedia of Industrial Chemistry, Vol. A2, VCG Weinheim, 1985, pages 405–406) e.g. violanthrone, isoviolanthrone or dyes of the imide green series, which last mentioned dyes in turn comprise those obtained from suitable previously mentioned anthrimides to form an acridine structure. The process of the invention is suitable e.g. for the reactions listed in the following table:

| Starting material | Final product |
|---|---|
| benzanthrone | → 4,4'-dibenzanthrone |
| pyrazolanthrone | → 3,3'-dipyrazolanthrone |
| benzanthrone | → violanthrone |
| di(benzanthron-3-yl)sulfide | → isoviolanthrone |
| 2-(benzanthron-3-yl)-pyrazole-anthrone | → Vat Blue 25 (C.I. 70500) |
| anthrimide from 3-bromobenz-anthrone and 1-aminoanthraquinone | → Vat Green 3 (C.I. 69500) |
| anthrimide from 3-bromobenz-anthrone and 1,5-diaminoanthra-quinone (+ subsequent benzoylation) | → Vat Olive GB (C.I. 69515) |
| anthrimide from 3,9-dibromobenz-anthrone and 1-aminoanthraquinone | → Vat Black 25 (C.I. 69525) |
| anthrimide from 3,9-dibromobenz-anthrone and 1-amino-5-benzamido-anthraquinone and 1-aminoanthraquinone | → Vat Olive Brown (C.I. 69530) |
| anthrimide from chlorinated benz-anthrone and 1-aminoanthraquinone | → Vat Grey 2G (US 2 456 589) |
| anthrimide from chlorinated benz-anthrone and 1-aminoanthraquinone | → Vat Blue Grey (US 3 008 962) |
| 1- or 2-aminoanthraquinone | → indanthrone |
| 2,2'-dimethyldianthraquinone-1,1'-diyl | → pyranthrone |

Preferably the process of the invention relates to the preparation of: 4,4'dibenzanthrone from benzanthrone, violanthrone from benzanthrone, isoviolanthrone from di(benzanthron-3-yl)sulfide and dyes of the imide green series from the corresponding anthrimides.

Particularly preferred embodiments of the process of the invention relate to the preparation of 4,4'-dibenzanthrone from benzanthrone, of violanthrone from benzanthrone, and of 11-(anthraquinon-1-yl-amino)anthra[2,1,9-m,n,a]naphth[2,3-h]acridine-5,10,15-trione from 3,9-bis(anthraquinon-1-ylamino)benzanthrone.

The process of the invention is carried out by charging the machine with kneading action first with the alkali metal hydroxide and a portion of the aliphatic alcohol and then heating the mixture, while the mixing elements are in operation, to a temperature in the range from e.g. 120° to 200° C., preferably from 125° to 150° C., whereupon preferably some of the alcohol will distill off. The respective starting material, in solid form or preferably in the form of a suspension in further aliphatic alcohol, is added to the resultant melt over about 1 to 12 hours, preferably over 75 to 180 minutes. During this addition, as well as during the subsequent reaction time, the temperature is normally kept at the initial value and aliphatic alcohol is preferably distilled off continuously.

Alternatively, it is also convenient to charge the mixer with the starting material in the aliphatic alcohol and then to add the alkali metal hydroxide.

The consistency of the reaction mixture is such that the mixture, even at the outset, is no longer stirrable in a conventional stirring apparatus, e.g. an agitator vessel, or remains unstirrable during the reaction.

The working up of the reaction mixture is effected in a manner known per se, e.g. by addition of water, isolating the product by suction filtration and subsequently drying it. If the reaction product is a vat dye, then the crude dye, which is partly in leuco form, is conveniently first oxidised in aqueous alkaline suspension with e.g. air, sodium hypochlorite solution or another oxidising agent, and then filtered with suction and dried.

Compared with the known processes for the preparation of anthraquinoid intermediates and vat dyes, the process of this invention affords in particular economic and environmental advantages. The reason is that substantially less alkali metal hydroxide is required and only a small quantity of solvent suffices, as the solvent can be almost completely recovered. A further advantage of the process that has a favourable influence on the space/time yield resides in the feature that the reaction and working up can take place in the same apparatus.

The process of the invention makes it possible to prepare useful anthraquinoid intermediates which can be further processed to dyes, as well as vat dyes which are suitable for dyeing or printing a wide range of materials and, in particular, natural or regenerated cellulose fibres in the presence of reducing agents, e.g. dithionite. The resultant intermediates and vat dyes are comparable in quality or superior to those obtained by conventional means.

In the following Examples parts and percentages are by weight.

EXAMPLE 1

A mixer reactor (Drais T reactor or Lödige Druvatherm with a volume of 160 litres) is charged with 18 parts of KOH, 7 parts of NaOH and 15 parts of methanol. The contents of the reactor are heated to 140° C. while the mixing elements are in operation to form a melt from which excess methanol is distilled off.

To this melt is added, over 100 minutes, a finely particulate suspension of 30 parts of methanol and 39 parts of anthrimide obtained by Ullmann reaction of 1 equivalent of 3,9-dibromobenzanthrone and 2 equivalents of 1-aminoanthraquinone in nitrobenzene (anthrimide content: 72.5%, the remainder consisting of inorganic salts, e.g. Na₂CO₃ and NaBr). During this addition, the reaction temperature is kept in the range from 140°–145° C., so that excess methanol is continually distilled off. After the addition of about 40% of the suspension, the reaction mixture undergoes change from a highly viscous phase to a solid, friable phase.

When the addition is complete, the reaction mixture remains for 1-2 hours in the reactor while the mixing elements are in operation and is thereafter worked up, with the addition of water, by oxidising the crude dye, which is partly in leuco form, with air, sodium hypochlorite solution or another oxidising agent in the aqueous alkaline suspension. The product is then collected by suction filtration and dried, affording 28 parts of a dye which dyes cotton in an olive green shade. Tinctorial strength, purity and shade conform to the usual standards. The bulk of the methanol is recovered (about 90%).

EXAMPLE 2

The procedure of Example 1 is repeated, replacing the salt-containing anthrimide by 28.5 parts of the same, but salt-free, anthrimide. The reaction mixture does not undergo conversion to the solid state until about 60% of the suspension has been added. The same dye is obtained in about the same yield.

EXAMPLE 3

The procedure of Example 1 is repeated, using a laboratory reactor mixer (Lödige type, with a volume of 5 litres) which is charged with 185 parts of KOH, 65 parts of NaOH and 150 parts of methanol, and adding 500 parts of methanol and 620 parts of salt-containing anthrimide. Yield: 450 parts of the same dye as in Example 1 in comparable quality.

EXAMPLE 4

The procedure of Example 3 is repeated, except that the reactor is charged with 125 parts of KOH, 125 parts of NaOH and 150 parts of methanol. Yield: 450 parts of the same dye in comparable quality.

EXAMPLE 5

The procedure of Example 3 is repeated, except that the reactor is charged with 250 parts of KOH and 150 parts of methanol. Yield: 450 parts of the same dye in comparable quality.

EXAMPLE 6

1300 parts of KOH and 485 parts of NaOH are dissolved in an agitator flask in 5400 parts of methanol. To this solution are added 3000 parts of the anthrimide employed in Example 1 and the mixture is homogenised. The resultant finely particulate suspension is added over 60 minutes at 140° C. to a melt consisting of 150 parts of KOH, 40 parts of NaOH and 110 parts of methanol in a kneader reactor of the type List AP 6 Batch or List Discotherm B (volume: 9 litres). During this addition, excess methanol distills off continuously. When the addition is complete, the reaction is allowed to go to completion for 60 minutes and then working up is effected as described in Example 1. Yield: 2155 parts of the same dye as in Example 1 in comparable quality.

EXAMPLE 7

The procedure of Example 3 is repeated, using 175 parts of KOH, 75 parts of NaOH and 150 parts of methanol and adding a suspension of 500 parts of methanol and 460 parts of anthrimide obtained by Ullmann reaction of 1 equivalent of 3-bromobenzanthrone and 1 equivalent of 1-aminoanthraquinone in nitrobenzene. Working up is then effected as described in Example 1. The product is dried, affording 450 parts of a dye which dyes cotton in an olive green shade. Tinctorial strength, shade and purity conform to the usual standards.

What is claimed is:

1. A process for the preparation of anthraquinoid intermediates and vat dyes obtained from unsubstituted or substituted benzanthrone, pyrazolanthrone or anthraquinone derivatives, in the presence of an alkali metal hydroxide and an aliphatic alcohol with a boiling point below 120° C., at elevated temperature, to effect dimerisiation or cyclisation, which process comprises carrying out the reaction with a weight ratio of alkali metal hydroxide to benzanthrone, pyrazolanthrone or anthraquinone derivative of less than 1:1 in a machine with kneading action but without grinding action.

2. A process according to claim 1, wherein one or two new C—C bonds are formed.

3. A process according to claim 1, wherein the aliphatic alcohol is a $C_1$–$C_4$ alkanol.

4. A process according to claim 3, wherein the $C_1$–$C_4$ alkanol is methanol, ethanol or isopropanol.

5. A process according to claim 1, wherein the alkali metal hydroxide is potassium hydroxide, sodium hydroxide or a mixture of potassium hydroxide and sodium hydroxide.

6. A process according to claim 5, wherein potassium hydroxide and sodium hydroxide are used in the ratio of 50:50 to 99:1.

7. A process according to claim 5, wherein potassium hydroxide and sodium hydroxide are used in the ratio of 70:30 to 80:20.

8. A process according to claim 1, wherein the weight ratio of alkali metal hydroxide to benzanthrone, pyrazolanthrone or anthraquinone derivative is from 0.5:1 to 0.95:1.

9. A process according to claim 1, wherein the benzanthrone, pyrazolanthrone or anthraquinone derivatives are unsubstituted or substituted benzanthrone or pyrazolanthrone, di(benzanthron-3-yl)sulfide, 2-(benzanthron-3-yl)pyrazolanthrone, an anthrimide derived from benzanathrone, 1- or 2-aminoanthraquinone or 2,2'-dimethyldianthraquinon-1,1'-diyl.

10. A process according to claim 1, wherein the anthrimide is obtained from halogenated benzanthrone and unsubstituted or further substituted 1-aminoanthraquinone.

11. A process according to claim 1, wherein the anthraquinoid derivatives and vat dyes are 4,4'-dibenzanthrone, 3,3'-dipyrazolanthrone, indanthrone, pyranthrone or benzanathrone dyes.

12. A process according to claim 1 for the preparation of 4,4-dibenzanthrone from benzanthrone, of violanthrone from benzanthrone, of isoviolanthrone from di(benzanthron-3-yl)sulfide, or of a dye of the imide green series from a corresponding anthrimide.

13. A process according to claim 1 for the preparation of 4,4'-dibenzanthrone from benzanthrone.

14. A process according to claim 1 for the preparation of violanthrone from benzanthrone.

15. A process according to claim 1 for the preparation of 11-(anthraquinon-1-ylamino)anthra[2,1,9-m,n,a]naphth[2,3-h]acridine-5,10,15-thrione from 3,9-bis(anthraquinon-1-ylamino)bezanthrone.

* * * * *